(12) United States Patent
Fan et al.

(10) Patent No.: US 10,437,375 B2
(45) Date of Patent: Oct. 8, 2019

(54) BUFFER UNIT, TOUCH-CONTROL DRIVING CIRCUIT, DISPLAY DEVICE AND DRIVING METHOD THEREOF

(71) Applicants: BOE TECHNOLOGY GROUP CO., LTD., Beijing (CN); Ordos Yuansheng Optoelectronics Co., Ltd., Ordos, Inner Mongolia (CN)

(72) Inventors: Jun Fan, Beijing (CN); Jian Sun, Beijing (CN); Cheng Li, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

(*) Notice: Subject to any disclaimer, the term of this patent is extended or adjusted under 35 U.S.C. 154(b) by 0 days.

(21) Appl. No.: 14/906,340

(22) PCT Filed: Jun. 18, 2015

(86) PCT No.: PCT/CN2015/081734
§ 371 (c)(1),
(2) Date: Jan. 20, 2016

(87) PCT Pub. No.: WO2016/119376
PCT Pub. Date: Aug. 4, 2016

(65) Prior Publication Data
US 2016/0370922 A1    Dec. 22, 2016

(30) Foreign Application Priority Data

Jan. 26, 2015  (CN) .......................... 2015 1 0038663

(51) Int. Cl.
*G06F 3/041*   (2006.01)
*G09G 3/36*    (2006.01)
*G06F 3/044*   (2006.01)

(52) U.S. Cl.
CPC .......... *G06F 3/0416* (2013.01); *G06F 3/044* (2013.01); *G06F 3/0412* (2013.01);
(Continued)

(58) Field of Classification Search
CPC ...... G06F 3/0412; G06F 3/0416; G06F 3/044; G09G 3/3696; G09G 3/3677;
(Continued)

(56) References Cited

U.S. PATENT DOCUMENTS

2011/0148853 A1   6/2011   Ko
2012/0113058 A1   5/2012   Yamazaki et al.
(Continued)

FOREIGN PATENT DOCUMENTS

CN   101231563 A   7/2008
CN   103135868 A   6/2013
(Continued)

OTHER PUBLICATIONS

Office action dated Jan. 19, 2017 for corresponding CN application 201510038663.7 with English translation.
International search report dated Oct. 21, 2015 for corresponding PCT application PCT/CN2015/081734.
(Continued)

*Primary Examiner* — Wing H Chow
(74) *Attorney, Agent, or Firm* — Nath, Goldberg & Meyer; Joshua B. Goldberg

(57) ABSTRACT

The present invention provides a buffer unit for the touch-control driving circuit of the display device, the display device comprises a display panel, which includes gate lines, common electrode lines, pixel electrodes and a common electrode, the common electrode lines are used as touch-control scanning signal lines in the touch-control driving circuit, wherein the buffer unit comprises an input terminal connected to an output of a shift register unit in a gate driving circuit and an output terminal connected to a corresponding gate line, the buffer unit is used to adjust a voltage (Continued)

input to the gate line to a target voltage in a touch-control phase, and a difference between the target voltage and a voltage of the pixel electrode is smaller than a first value when a high level signal is applied to the touch-control scanning signal line.

14 Claims, 2 Drawing Sheets

(52) U.S. Cl.
CPC ......... *G09G 3/3696* (2013.01); *G09G 3/3677* (2013.01); *G09G 2300/0426* (2013.01); *G09G 2300/0809* (2013.01); *G09G 2310/0286* (2013.01); *G09G 2310/0291* (2013.01)

(58) Field of Classification Search
CPC ... G09G 2300/0426; G09G 2300/0809; G09G 2310/0286; G09G 2310/0291
See application file for complete search history.

(56) References Cited

U.S. PATENT DOCUMENTS

| | | | | |
|---|---|---|---|---|
| 2013/0127752 A1* | 5/2013 | Takeuchi | ............ | G02F 1/13338 345/173 |
| 2013/0127779 A1* | 5/2013 | Lillie | .................... | G06F 3/0416 345/174 |

FOREIGN PATENT DOCUMENTS

| | | |
|---|---|---|
| CN | 103713792 A | 4/2014 |
| CN | 104503632 A | 4/2015 |
| CN | 204360353 U | 5/2015 |
| WO | 2014141378 A1 | 9/2014 |

OTHER PUBLICATIONS

Written opinion of the international search authority for corresponding PCT application PCT/CN2015/081734 with English translation.
"Digital Electric Technology" and English abstract. pp. 81-83.
Extended European search report dated Aug. 14, 2018 for corresponding application No. 15879582.3.

* cited by examiner

BUFFER UNIT, TOUCH-CONTROL DRIVING CIRCUIT, DISPLAY DEVICE AND DRIVING METHOD THEREOF

This is a National Phase Application filed under 35 U.S.C. 371 as a national stage of PCT/CN2015/081734, filed Jun. 18, 2015, an application claiming the benefit of Chinese Application No. 201510038663.7, filed Jan. 26, 2015 the content of each of which is hereby incorporated by reference in its entirety.

TECHNICAL FIELD

The present invention relates to the field of display technology, and particular to a buffer unit for a touch-control driving circuit, a touch-control driving circuit, a display device and a driving method thereof.

BACKGROUND

With the increasing thinness and fineness of mobile products such as mobile phones and tablet computers, screen with higher resolution and smaller thickness is desired, therefore, in-cell touch display screen with simple structure has gradually become the mainstream of the development of market.

An in-cell touch display screen comprises a display panel, the display panel comprises gate lines, common electrode lines, pixel electrodes and a common electrode, wherein the common electrode lines are used as touch-control scanning signal lines in the touch-control driving circuit.

An operation cycle of the in-cell touch display screen includes a display phase and touch-control phase. In the touch-control phase, the common electrode line, as the touch-control scanning signal line in the touch-control driving circuit, is driven in a time sharing manner. In the touch-control phase, the display panel is not supplied with display signals any more, therefore, in the touch-control phase, only a voltage difference between the pixel electrodes and the common electrode is needed to maintain the angle of deflection of the liquid crystal molecules.

Since the touch-control scanning signal lines are connected to the common electrode, a voltage of the common electrode in the touch-control phase is different from that of the common electrode in the display phase, in order to maintain the angle of deflection of the liquid crystal molecules, a voltage of the pixel electrode should be changed so as to maintain the voltage difference between the pixel electrode and the common electrode. With variation of the voltage of the common electrode in the touch-control phase, the voltage of the pixel electrode also varies, however, a voltage of a gate of a thin film transistor of an existing display panel usually remains the same during the touch-control phase, which results in variation of voltage between the gate and source connected to the pixel electrode of the thin film transistor, so that a phenomenon in which a curve of the transconductance of the thin film transistor in the pixel unit is drifted always occurs after the display screen operates for a while, affecting the service life of the thin film transistor.

SUMMARY OF THE INVENTION

An object of the present invention is to provide a buffer unit for a touch-control driving circuit, a touch-control driving circuit, a display device and a driving method thereof, which can reduce the phenomenon in which a curve of the transconductance of the thin film transistor in the pixel unit is drifted.

To realize the above object, the present invention provides a buffer unit for a touch-control driving circuit of a display device, the display device comprises a display panel, which includes gate lines, common electrode lines, pixel electrodes and a common electrode, the common electrode lines are used as touch-control scanning signal lines in the touch-control driving circuit, wherein the buffer unit comprises an input terminal connected to an output of a shift register unit in a gate driving circuit and an output terminal connected to a corresponding gate line, the buffer unit is used to adjust a voltage input to the gate line to a target voltage during a touch-control phase, and a difference between the target voltage and a voltage of the pixel electrode is smaller than a first value when a high level signal is applied to the touch-control scanning signal line.

Preferably, the target voltage is larger than an output voltage of the shift register unit of the gate driving circuit when the high level signal is applied to the touch-control scanning signal line.

Preferably, the target voltage is larger than an output voltage of the shift register unit of the gate driving circuit when the high level signal is applied to the touch-control scanning signal line, and is equal to the output voltage of the shift register unit when a low level signal is applied to the touch-control scanning signal line.

Preferably, the target voltage is larger than the output voltage of the shift register unit during the whole touch-control phase.

Preferably, in the touch-control phase, a high level of 10V and a low level of 0V are applied to the touch-control scanning signal line in a time sharing manner, the output voltage of the shift register unit is −8V, a absolute value of a voltage difference between the pixel electrode and the common electrode is 5V, and the first value is 23V.

Preferably, the buffer unit comprises a high level input terminal, a low level input terminal, a target voltage input terminal for supplying the target voltage, a first strobe module and a second strobe module, a first input terminal of the first strobe module is connected to the high level input terminal, a second input terminal of the first strobe module functions as the input terminal of the buffer unit, a third input terminal of the first strobe module is connected to an output terminal of the second strobe module, the output terminal of the first strobe module functions as the output terminal of the buffer unit; a first input terminal of the second strobe module is connected to the low level input terminal, and a second input terminal of the second strobe module is connected to the target voltage input terminal, wherein in a charging sub-phase of a display phase, the high level input terminal is electrically connected to the output terminal of the first strobe module;

in a voltage holding sub-phase in the display phase, the low level input terminal is electrically connected to the output terminal of the first strobe module; and in a touch-control phase, the target voltage input terminal is electrically connected to the output terminal of the first strobe module.

Preferably, the first strobe module comprises a first thin film transistor and a second thin film transistor, both gates of the first thin film transistor and the second thin film transistor are connected to the output terminal of the shift register unit, a first electrode of the first thin film transistor is connected to the high level input terminal, a second electrode of the first thin film transistor is connected to a first electrode of the second thin film transistor, and a second electrode of the second thin film transistor is connected to the output terminal of the second strobe module, wherein the first thin film transistor is controlled by the output voltage from the shift register unit so as to be turned on in the charging sub-phase of the display phase and to be turned off in the touch-control phase;

the second thin film transistor is controlled by the output voltage from the shift register unit so as to be turned off in the charging sub-phase of the display phase and to be turned on in a voltage holding sub-phase and the touch-control phase.

Preferably, the second strobe module comprises a first strobe switch and a second strobe switch, the first strobe switch is connected between the low level input terminal and the output terminal of the second strobe module, the second strobe switch is connected between the target voltage input terminal and the output terminal of the second strobe module, wherein the first strobe module is turned on in the voltage holding sub-phase of the display phase and is turned off in the charging sub-phase and touch-control phase; and the second strobe module is turned on in the touch-control phase and is turned off in the display phase.

Preferably, the buffer unit further comprises a control module, which controls the first strobe switch to be turned on in the voltage holding sub-phase of the display phase and turned off in the touch-control phase, and controls the second strobe switch to be turned on in the touch-control phase and turned off in the display phase.

Accordingly, the present invention further provides a touch-control driving circuit comprising the above buffer unit.

Accordingly, the present invention further provides a display device comprising the above touch-control driving circuit and a gate driving circuit, the gate driving circuit comprises a plurality of shift register units which are cascaded, each of the shift register units corresponds to a said buffer unit, an output terminal of the shift register unit is connected to an input terminal of the buffer unit.

Preferably, the shift register unit outputs a low level in a charging sub-phase of a display phase and outputs a high level in a voltage holding sub-phase of the display phase and the touch-control phase.

Accordingly, the present invention further provides a driving method for driving the above display device, comprising:

adjusting a voltage input to a gate line to a target voltage in a touch-control phase, wherein a difference between the target voltage and a voltage of the pixel electrode is smaller than a first value when a high level signal is applied to the touch-control scanning signal line.

Preferably, the buffer unit comprises a high level input terminal, a low level input terminal, a target voltage input terminal for supplying the target voltage, a first strobe module and a second strobe module, a first input terminal of the first strobe module is connected to the high level input terminal, a second input terminal of the first strobe module functions as the input terminal of the buffer unit, a third input terminal of the first strobe module is connected to an output terminal of the second strobe module, the output terminal of the first strobe module functions as the output terminal of the buffer unit; a first input terminal of the second strobe module is connected to the low level input terminal, and a second input terminal of the second strobe module is connected to the target voltage input terminal, wherein the step of adjusting a voltage input to a gate line to a target voltage in a touch-control phase comprises: controlling the target voltage input terminal to be electrically connected to the output terminal of the first strobe module;

the method further comprises:

in a charging sub-phase of a display phase, controlling the high level input terminal to be electrically connected to the output terminal of the first strobe module;

in a voltage holding sub-phase in the display phase, controlling the low level input terminal to be electrically connected to the output terminal of the first strobe module.

Preferably, the first strobe module comprises a first thin film transistor and a second thin film transistor, both gates of the first thin film transistor and the second thin film transistor are connected to the output terminal of the shift register unit, a first electrode of the first thin film transistor is connected to the high level input terminal, a second electrode of the first thin film transistor is connected to a first electrode of the second thin film transistor, and a second electrode of the second thin film transistor is connected to the output terminal of the second strobe module; the second strobe module comprises a first strobe switch and a second strobe switch, the first strobe switch is connected between the low level input terminal and the output terminal of the second strobe module, the second strobe switch is connected between the target voltage input terminal and the output terminal of the second strobe module;

the step of controlling the target voltage input terminal to be electrically connected to the output terminal of the first strobe module comprises: controlling the second strobe switch and the second thin film transistor to be turned on, and the first thin film transistor to be turned off;

the step of controlling the high level input terminal to be electrically connected to the output terminal of the first strobe module comprises: controlling the first thin film transistor to be turned on, and the second thin film transistor to be turned off;

the step of controlling the low level input terminal to be electrically connected to the output terminal of the first strobe module comprises: controlling the first strobe switch and the second thin film transistor to be turned on, and the first thin film transistor to be turned off.

In the present invention, the buffer unit adjusts the voltage of the gate line to the target voltage when the high level signal is applied to the touch-control scanning signal line, so that difference between the voltage of the gate line and the voltage of the pixel electrode is reduced, thus the voltage between the gate connected to the gate line and the source connected to the pixel electrode of the thin film transistor can be reduced. For the thin film transistor, the more the voltage between the gate and the source is, the easier the phenomenon in which the curve of the transconductance of the thin film transistor is drifted occurs. The buffer unit in the present invention can reduce the voltage between the gate and the source, so that the phenomenon in which the curve of the transconductance of the thin film transistor is drifted can be effectively reduced, the service life of the thin film transistor can be prolonged, and the quality of the display device can be improved.

DESCRIPTION OF THE DRAWINGS

Accompanying drawings are used to provide further understanding to the present invention, constitute a part of the specification, and are used to explain the present invention together with following embodiments, but not to limit the present invention, wherein.

REFERENCE NUMERALS

Figure 1:
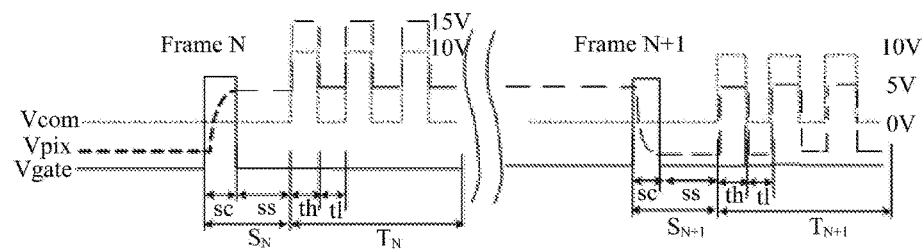
FIG. 1 is a timing chart of respective voltages of electrodes of a pixel unit of a touch screen in the prior art.

10. first strobe module; 20. second strobe module; 30, shift register unit; 40. control module; M1. first thin film transistor; M2. second thin film transistor; SW1. first strobe switch; SW2. second strobe switch; VDD. high level input terminal; Vlow. low level input terminal; Vtarget. target voltage input terminal.

DETAILED DESCRIPTION OF EMBODIMENTS

Embodiments will be described in detail below in conjunction with the accompanying drawings. It should be understood that, the embodiments described herein are only used to describe and explain the present invention, but not to limit the present invention.

As a first aspect of the present invention, a buffer unit for a touch-control driving circuit of a display device is provided, the display device comprises a display panel, the display device comprises a display panel including gate lines, common electrode lines, pixel electrodes and a common electrode, the common electrode lines are used as touch-control scanning signal lines in the touch-control driving circuit, wherein the buffer unit comprises an input terminal connected to an output of a shift register unit in a gate driving circuit and an output terminal connected to a corresponding gate line, the buffer unit is used to adjust a voltage input to the gate to a target voltage during a touch-control phase, and a difference between the target voltage and a voltage of the pixel electrode is smaller than a first value when a high level signal is applied to the touch-control scanning signal line.

In touch-control phases (the phases $T_N$ and $T_{N+1}$ in FIG. 1) of the existing touch-control driving circuit, the gate driving circuit supplies low level signals to gate lines, and a common electrode line functions as a touch-control scanning signal line. To maintain the angle of deflection of the liquid crystal molecules, voltages of pixel electrodes are needed to be changed so as to maintain voltage difference between the pixel electrodes and the common electrode. With respect to polarity reverse, in the case that the polarity is positive, when a high level signal is applied to the touch-control scanning signal line (that is, when the Vcom is at high level in the $t_h$ phase in FIG. 1), voltage Vpix of the pixel electrode is higher than the voltage of the touch-control scanning signal line, and the gate voltage of the thin film transistor (that is, the voltage of gate line Vgate) remains the same during the touch-control phase, thus a voltage between the gate and the source connected to the pixel electrode of the thin film transistor is increased, and the phenomenon in which a curve of the transconductance of the thin film transistor is drifted easily occurs.

In contrast, in the display panel of the present invention, a buffer unit is provided in the touch-control driving circuit for adjusting the voltage input to the gate line in the touch-control phase to a target voltage, wherein a difference between the target voltage and a voltage of the pixel electrode is smaller than a first value when a high level signal is applied to the touch-control scanning signal line. The first value in the present invention may be a sum of a difference between the voltage of the pixel electrode Vpix and the high level signal on the touch-control scanning signal line and a difference between the high level signal on the touch-control scanning signal line and a low level signal output from the shift register unit. By means of the adjustment by the buffer unit in the present invention, difference between the voltage of the gate line Vgate and the voltage of the pixel electrode Vpix is smaller than the first value, so that a voltage Vgs between the gate connected to the gate line and the source connected to the pixel electrode of the thin film transistor is decreased, for the thin film transistor, the larger the voltage Vgs between the gate and the source is, the more the phenomenon in which a curve of the transconductance is drifted occurs, therefore, in the case of the voltage Vgs between the gate and the source is decreased by the buffer unit in the present invention, the phenomenon in which a curve of the transconductance of the thin film transistor is drifted can be effectively reduced, and the service life of the thin film transistor can be prolonged.

In order to make the difference between the target voltage and the voltage of the pixel electrode smaller than a first value when a high level signal is applied to the touch-control scanning signal line (the $t_h$ phase in FIG. 2 and FIG. 3), the target voltage is larger than an output voltage from the shift register unit of the gate driving circuit when a high level signal is applied to the touch-control scanning signal line, that is, the voltage of the gate line Vgate is larger than the output voltage of the shift register unit when a high level signal is applied to the touch-control scanning signal line. When the first value is a sum of the difference between the voltage of the pixel electrode Vpix and the high level signal on the touch-control scanning signal line and the difference between the high level signal on the touch-control scanning signal line and the low level signal output from the shift register unit, the difference between the voltage of the gate line Vgate and the voltage of the pixel electrode Vpix is smaller than the target value. In other words, compared to the prior art, the voltage of the gate line Vgate is increased by the buffer unit at least in the $t_h$ phase, and in common, in the $t_h$ phase, the voltage Vgs between the gate and the source of the thin film transistor is large, therefore, increase of the voltage of the gate line Vgate causes a decrease of the voltage Vgs between the gate and the source of the thin film transistor.

Figure 2:
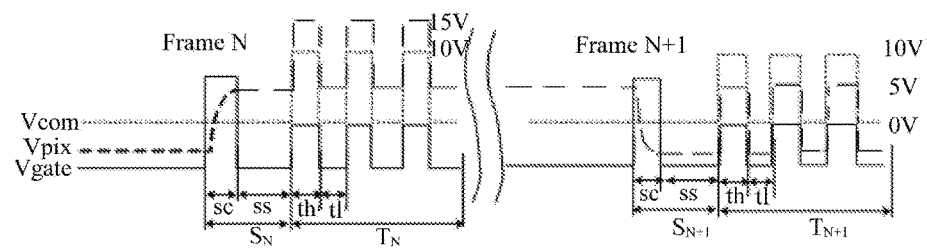
FIG. 2 is a timing chart of respective voltages of electrodes of a pixel unit in a first embodiment of the present invention.

As an embodiment of the present invention, as shown in FIG. 2, the target voltage is larger than the output voltage from the shift register unit when a high level signal is applied to the touch-control scanning signal line ($t_h$ phase), and is equal to the output voltage from the shift register unit when a low level signal is applied to the touch-control scanning signal line ($t_1$ phase). In the touch-control phase of the Nth frame ($T_N$ phase), the touch-control scanning signal lines are supplied with the high level signal and the low level signal in a time sharing manner, the voltage of the pixel electrode Vpix is larger than the high level of the touch-control scanning signal line so as to exhibit a positive polarity, therefore, when the voltage of the gate line Vgate is increased to be larger than the output voltage of the shift register unit in the $t_h$ phase, the difference between the voltage of the pixel electrode Vpix and the voltage of the gate line Vgate can be decreased. When the touch-control scanning signal lines are supplied with a low level signal ($t_1$ phase), since the voltage of the touch-control scanning signal line $V_{Tx}$ is low, the voltage difference may be maintained by a voltage of the pixel electrode Vpix which is not so high. During the whole touch-control phase, the difference between the voltage of the pixel electrode Vpix and the voltage of the gate line Vgate is small, having less affect on the curve of the transconductance of the thin film transistor. Also, in this embodiment, the voltage Vgs between the gate and the source of the thin film transistor has the same polarity in the $t_h$ phase and the $t_1$ phase, which can prevent the transition of the polarity and can promote the stability of the touch-control.

Figure 3:
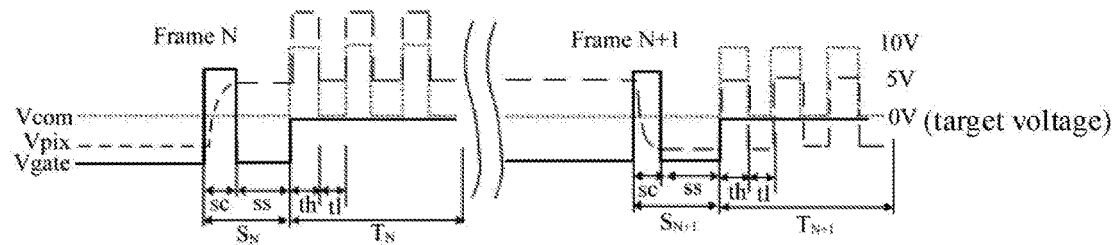
FIG. 3 is a timing chart of respective voltages of electrodes of a pixel unit in a second embodiment of the present invention.

As another embodiment of the present invention, as shown in FIG. 3, the target voltage is larger than the output voltage from the shift register unit during the whole touch-control phase. For example, the target voltage is zero during the whole touch-control phase. In this embodiment, during the whole touch-control phase, the voltage of the gate line Vgate is increased compared to that before the adjustment, so that the voltage Vgs between the gate and the source of the thin film transistor in the pixel unit after the adjustment is decreased both in the $t_h$ phase and the $t_1$ phase. When the target voltage remains the same during the whole touch-control phase, a circuit providing the target voltage is desired to maintain steady output without varying the value of the target voltage according to the variation of the voltage of the touch-control scanning signal line.

Specifically, as shown in FIG. 2 and FIG. 3, in the touch-control phase, the touch-control scanning signal lines are supplied with the high level of 10V and the low level of 0V in a time sharing manner (that is, the voltage of the common electrode Vcom is a square signal with 10V and 0V), the output voltage of the shift register unit is −8V, an absolute value of the voltage difference between the pixel electrode and the common electrode is 5V, and the first value is 23V.

Taking a case of the voltage difference between the pixel electrode and the common electrode has positive polarity in the Nth frame (+5V) and has negative polarity in the (N+1)th frame (−5V) as an example, in the touch-control phase of the Nth frame ($T_N$ phase), when the voltage of the touch-control scanning signal line is 10V ($t_h$ phase), the voltage of the pixel electrode Vpix is 15V; when the voltage of the touch-control scanning signal line is 0V ($t_1$ phase), the voltage of the pixel electrode Vpix is 5V. In the touch-control phase of the (N+1)th frame ($T_{N+1}$ phase), when the voltage of the touch-control scanning signal line is 10V ($t_h$ phase), the voltage of the pixel electrode Vpix is 5V; when the voltage of the touch-control scanning signal line is 0V ($t_1$ phase), the voltage of the pixel electrode Vpix is −5V.

Therefore, before the buffer unit adjusts the voltage of the gate line Vgate, as shown in FIG. 1, in the $t_h$ phase in the Nth frame, the difference between the voltage of the pixel electrode Vpix and the voltage of the gate line Vgate is 15+8=23V, in the $t_1$ phase, the difference between the voltage of the pixel electrode Vpix and the voltage of the gate line Vgate is 5−(−8)=13V; in the $t_h$ phase in the (N+1)th frame, the difference between the voltage of the pixel electrode Vpix and the voltage of the gate line Vgate is 5−(−8)=13V, in the $t_1$ phase, the difference between the voltage of the pixel electrode Vpix and the voltage of the gate line Vgate is −5−(−8)=3V. It can be seen that, in the prior art, in the touch-control phase, the maximum of the difference between the voltage of the pixel electrode Vpix and the voltage of the gate line Vgate is 23V. In contrast, in the present invention, after the buffer unit adjusts the voltage of the gate line Vgate, the difference between the voltage of the pixel electrode Vpix and the voltage of the gate line Vgate may be smaller than 23V, so that the voltage Vgs between the gate and the source of the thin film transistor is smaller than 23V.

In the embodiment shown in FIG. 2, in the $t_h$ phase of the Nth frame and the $t_h$ phase of the (N+1)th frame, the voltage of the gate line Vgate is increased to 0V, therefore, in the $t_h$ phase of the Nth frame, the difference between the voltage of the pixel electrode Vpix and the voltage of the gate line Vgate is 15V, in the $t_1$ phase of the Nth frame, the difference between the voltage of the pixel electrode Vpix and the voltage of the gate line Vgate is 5−(−8)=13V, in the $t_h$ phase of the (N+1)th frame, the difference between the voltage of the pixel electrode Vpix and the voltage of the gate line Vgate is 5−0=5V, in the $t_1$ phase of the (N+1)th frame, the difference between the voltage of the pixel electrode Vpix and the voltage of the gate line Vgate is −5−(−8)=3V, it can be seen that, the maximum value of the difference between the voltage of the pixel electrode Vpix and the voltage of the gate line Vgate is 15V, that is, the maximum value of voltage between the gate and the source of the thin film transistor is 15V, which is smaller than 23V in the prior art.

In the embodiment shown in FIG. 3, in the $T_N$ phase of the Nth frame and the $T_{N+1}$ phase of the (N+1)th frame, the voltage of the gate line Vgate is increased to 0V, at this time, in the $t_h$ phase of the Nth frame, the difference between the voltage of the pixel electrode Vpix and the voltage of the gate line Vgate is 15V, in the $t_1$ phase of the Nth frame, the difference between the voltage of the pixel electrode Vpix and the voltage of the gate line Vgate is 5V, in the $t_h$ phase of the (N+1)th frame, the difference between the voltage of the pixel electrode Vpix and the voltage of the gate line Vgate is 5V, in the $t_1$ phase of the (N+1)th frame, the difference between the voltage of the pixel electrode Vpix and the voltage of the gate line Vgate is −5V, it can be seen that, the maximum of the difference between the voltage of the pixel electrode Vpix and the voltage of the gate line Vgate is 15V, which is smaller than 23V in the prior art.

Generally, in the gate driving circuit, the polarity of the output voltage of the shift register unit is the polarity of the voltage of the gate line output from the gate driving circuit. The buffer unit provided in the present invention is applicable to this situation.

The buffer unit provided in the present invention is also applicable to another situation: the polarity of the output voltage of the shift register unit is the polarity of the voltage of the gate line output from the gate driving circuit. In this case, as shown in FIG. 4, the buffer unit in the present invention may comprise a high level input terminal VDD, a low level input terminal Vlow, a target voltage input terminal Vtarget for supplying the target voltage, a first strobe module 10 and a second strobe module 20, a first input terminal of the first strobe module 10 is connected to the high level input terminal VDD, a second input terminal of the first strobe module 10 functions as the input terminal of the buffer unit (that is, is connected to the output terminal of the shift register unit 30), a third input terminal of the first strobe module 10 is connected to an output terminal of the second strobe module 20, the output terminal of the first strobe module 10 functions as the output terminal of the buffer unit (that is, is connected to a gate line corresponding to the shift register unit); a first input terminal of the second strobe module is connected to the low level input terminal Vlow, and a second input terminal of the second strobe module 20 is connected to the target voltage input terminal Vtarget, wherein in a charging sub-phase of a display phase (a sc phase in FIG. 2 and FIG. 3), the high level input terminal VDD is connected to the output terminal of the first strobe module 10, so that a signal with high voltage is input to a corresponding gate line, thus thin film transistors in the corresponding row of pixel units are turned on;

in a voltage holding sub-phase of the display phase (a ss phase in FIG. 2 and FIG. 3), the low level input terminal Vlow is connected to the output terminal of the first strobe module 10, so that a signal with low voltage is input to a corresponding gate line, thus thin film transistors in the corresponding row of pixel units are turned off;

in the touch-control phase, the target voltage input terminal Vtarget is connected to the output terminal of the first strobe module 10 so as to input the target voltage signal to the corresponding gate line.

Figure 4:
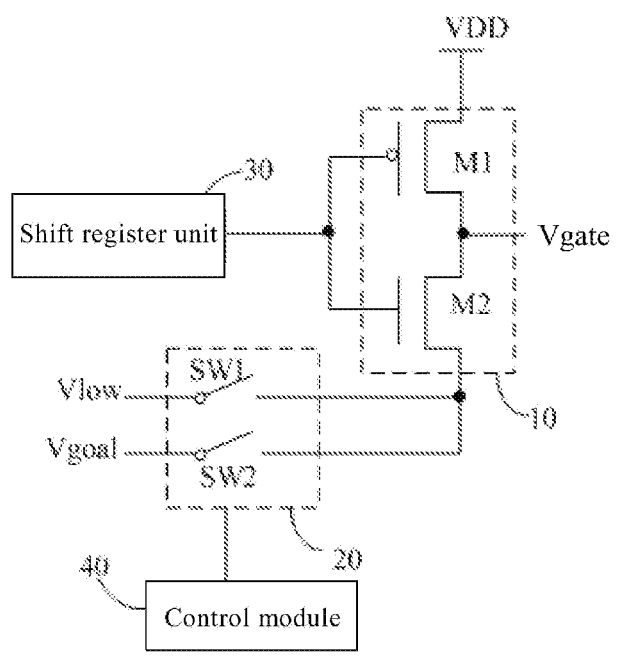
FIG. 4 is structural diagram of a buffer unit in a embodiment of the present invention.

Specifically, as shown in FIG. 4, the first strobe module 10 comprises a first thin film transistor M1 and a second thin film transistor M2, both the gates of the first thin film transistor M1 and second thin film transistor M2 are connected to the output terminal of the shift register unit 30, a first electrode of the first thin film transistor M1 is connected to the high level input terminal VDD, a second electrode of the first thin film transistor M1 is connected to a first electrode of the second thin film transistor M2, and a second electrode of the second thin film transistor M2 is connected to the output terminal of the second strobe module 20, wherein the first thin film transistor M1 is controlled by the output voltage from the shift register unit 30 so as to be turned on in the charging sub-phase of the display phase and to be turned off in the touch-control phase;

the second thin film transistor M2 is controlled by the output voltage from the shift register unit 30 so as to be turned off in the charging sub-phase of the display phase and turned on in the touch-control phase.

The above first thin film transistor M1 may be a P type thin film transistor, the second thin film transistor M2 may be an N type thin film transistor. In the charging sub-phase of the display phase, the shift register unit outputs a signal with low voltage, so that the first thin film transistor M1 is turned on and the second thin film transistor M2 is turned off, and the signal with high voltage from the high level input terminal VDD is input to the gate line; in the voltage holding sub-phase of the display phase, the shift register unit outputs a signal with high voltage, so that the second thin film transistor M2 is turned on and the first thin film transistor M1 is turned off, and a signal with low voltage from the low level input terminal Vlow is input to the gate line through the second strobe module 20 and the second thin film transistor M2; in the touch-control phase, the shift register unit outputs a signal with high voltage, so that the second thin film transistor M2 is turned on and the first thin film transistor M1 is turned off, and the target voltage of the target voltage input terminal Vtarget is input to the gate line through the second strobe module 20 and the second thin film transistor M2, so that the voltage of the gate line Vgate is adjusted to the target voltage.

As shown in FIG. 4, the second strobe module 20 may comprise a first strobe switch SW1 and a second strobe switch SW2, the first strobe switch SW1 is connected between the low level input terminal Vlow and the output terminal of the second strobe module 20, the second strobe switch SW2 is connected between the target voltage input terminal Vtarget and the output terminal of the second strobe module 20, wherein the first strobe switch SW1 is turned on in the voltage holding sub-phase of the display phase and is turned off in the charging sub-phase and touch-control phase; and the second strobe switch SW2 is turned on in the touch-control phase and is turned off in the display phase.

As shown in FIG. 2 and FIG. 3, in the charging sub-phase (the sc phase) of the display phase, the output voltage of the shift register unit controls the first thin film transistor M1 to be turned on and the second thin film transistor M2 to be turned off, and at the meantime, the first strobe switch SW1 and the second strobe switch SW2 to be turned off, therefore, the signal with high voltage supplied from the high level input terminal VDD is input to the gate line through the first thin film transistor M1; in the voltage holding sub-phase of the display phase (ss phase), the output voltage of the shift register unit controls the first thin film transistor M1 to be turned off and the second thin film transistor M2 to be turned on, and at the meantime, the first strobe switch SW1 to be turned on and the second strobe switch SW2 to be turned off, therefore, the signal with low voltage supplied from the low level input terminal Vlow is input to the gate line through the first strobe switch SW1 and the second thin film transistor M2; in the touch-control phase ($T_N$ phase and $T_{N+1}$ phase), the output voltage of the shift register unit controls the first thin film transistor M1 to be turned off and the second thin film transistor M2 to be turned on, and at the meantime, the first strobe switch SW1 to be turned off and the second strobe switch SW2 to be turned on, at this time, the target voltage supplied from the target voltage input terminal Vtarget is input to the gate line through the second strobe switch SW2 and the second thin film transistor M2.

The buffer unit further comprises a control module 40, which controls the first strobe switch SW1 to be turned on in the voltage holding sub-phase of the display phase and turned off in the touch-control phase, and controls the second strobe switch SW2 to be turned on in the touch-control phase and turned off in the display phase.

In the present invention, there is no limitation to the forms of the first strobe switch SW1 and the second strobe switch SW2, for example, the first strobe switch SW1 and the second strobe switch SW2 may be thin film transistors, and gates of them may be connected to a control circuit, and ON and OFF of them may be controlled by adjusting the voltages of their gates.

As a second aspect of the present invention, a touch-control driving circuit is provided which comprises the above buffer unit.

As a third aspect of the present invention, a display device is provided which comprises the above touch-control driving circuit and a gate driving circuit, the gate driving circuit comprises a plurality of shift register units which are cascaded, each of the shift register unit corresponds to a said buffer unit, an output terminal of the shift register unit is connected to an input terminal of the buffer unit.

Specifically, the shift register unit outputs a low level in the charging sub-phase of the display phase and outputs a high level in the voltage holding sub-phase of the display phase and the touch-control phase.

As above, the buffer unit comprises a first strobe module and a second strobe module, the first strobe module comprises a first thin film transistor and a second thin film transistor, the second strobe module comprises a first strobe switch and a second strobe switch. In the sub-phase for charging, the shift register unit outputs a low level to control the first thin film transistor to be turned on and the second thin film transistor to be turned off, so that the high level input terminal is connected to the output terminal of the first strobe module, a high level signal is output to the gate line, and the thin film transistor corresponding to the gate line is turned on; in the display phase and the sub-phase for voltage holding, the shift register unit outputs a high level to control the second thin film transistor to be turned on and the first thin film transistor to be turned off, at the meantime, the first strobe switch to be turned on, so that the low level input terminal is connected to the output terminal of the first strobe module, a low level signal is output to the gate line, and the thin film transistor corresponding to the gate line is turned off; in the touch-control phase, the shift register unit outputs a high level to control the second thin film transistor to be turned on and the first thin film transistor to be turned off, at the meantime, the second strobe switch is turned on, so that the target voltage signal terminal is connected to the output terminal of the first strobe module, and the target voltage is input to the gate line.

As a fourth aspect of the present invention, a driving method for driving the above display device is provided, comprising:

adjusting a voltage input to a gate to a target voltage in a touch-control phase, wherein a difference between the target voltage and a voltage of the pixel electrode is smaller than a first value when a high level signal is applied to the touch-control scanning signal line.

Taking a case of a buffer unit comprises a high level input terminal VDD, a low level input terminal Vlow, a target voltage input terminal Vtarget, a first strobe module 10 and a second strobe module 20 as an example, a first input terminal of the first strobe module 10 is connected to the high level input terminal VDD, a second input terminal of the first strobe module 10 functions as the input terminal of the buffer unit, a third input terminal of the first strobe module 10 is connected to an output terminal of the second strobe module 20, the output terminal of the first strobe module 10 functions as the output terminal of the buffer unit; a first input terminal of the second strobe module 20 is connected to the low level input terminal Vlow, and a second input terminal of the second strobe module 20 is connected to the target voltage input terminal for supplying the target voltage; the step of adjusting the voltage input to the gate to the target voltage comprises: controlling the target voltage input terminal to be connected to the output terminal of the first strobe module 10;

the method further comprises:

in a charging sub-phase of a display phase, controlling the high level input terminal to be connected to the output terminal of the first strobe module;

in a voltage holding sub-phase of the display phase, controlling the low level input terminal to be connected to the output terminal of the first strobe module.

The first strobe module 10 comprises a first thin film transistor M1 and a second thin film transistor M2, both the gates of the first thin film transistor M1 and second thin film transistor M2 are connected to the output terminal of the shift register unit 30, a first electrode of the first thin film transistor M1 is connected to the high level input terminal VDD, a second electrode of the first thin film transistor M1 is connected to a first electrode of the second thin film transistor M2, and a second electrode of the second thin film transistor M2 is connected to the output terminal of the second strobe module 20; the second strobe module 20 may comprise a first strobe switch SW1 and a second strobe switch SW2, the first strobe switch SW1 is connected between the low level input terminal Vlow and the output terminal of the second strobe module 20, the second strobe switch SW2 is connected between the target voltage input terminal Vtarget and the output terminal of the second strobe module 20.

the step of controlling the target voltage input terminal to be connected to the output terminal of the first strobe module comprises: controlling the second strobe switch SW2 and the second thin film transistor M2 to be turned on, and the first thin film transistor M1 to be turned off;

the step of controlling the high level input terminal to be connected to the output terminal of the first strobe module comprises: controlling the first thin film transistor M1 to be turned on, and the second thin film transistor to be turned off;

the step of controlling the low level input terminal to be connected to the output terminal of the first strobe module comprises: controlling the first strobe switch SW1 and the second thin film transistor M2 to be turned on, and the first thin film transistor M1 to be turned off.

From the description of the buffer unit, the touch-control driving circuit and driving method thereof, it can be seen that, by means of the adjustment of the buffer unit, difference between the voltage of the gate line Vgate and the voltage of the pixel electrode Vpix is decreased, so that a voltage Vgs between the gate connected to the gate line and the source connected to the pixel electrode of the thin film transistor is decreased; for the thin film transistor, the more the voltage Vgs between the gate and the source is, the more the phenomenon in which a curve of the transconductance is drifted occurs, therefore, in the case of the voltage Vgs between the gate and the source is decreased by the buffer unit in the present invention, the phenomenon in which a curve of the transconductance of the thin film transistor is drifted can be effectively reduced, and the service life of the thin film transistor can be prolonged.

It should be understood that, the above embodiments are only exemplary embodiments used to explain the principle of the present invention and the protection scope of the present invention is not limited thereto. The person skilled in the art can make various variations and modifications without departing from the spirit and scope of the present invention, and these variations and modifications should be considered to belong to the protection scope of the invention.

The invention claimed is:

1. A buffer unit for a touch-control driving circuit of a display device, the display device comprises a display panel, which includes gate lines, common electrode lines, pixel electrodes and a common electrode, the common electrode lines are used as touch-control scanning signal lines in the touch-control driving circuit, wherein the buffer unit comprises an input terminal connected to an output of a shift register unit in a gate driving circuit and an output terminal connected to a corresponding gate line, the buffer unit is used to adjust a voltage input to the gate line to a target voltage during a touch-control phase under a control of an output voltage from the output of the shift register unit such that a difference between the target voltage and a voltage of the pixel electrode is smaller than a first value when a high level signal is applied to the touch-control scanning signal line, and the first value is a sum of a difference between the voltage of the pixel electrode and the high level signal on the touch-control scanning signal line and a difference between the high level signal on the touch-control scanning signal line and a low level signal output from the shift register unit, and the target voltage is constant and the same for pixels of both negative polarity and positive polarity included in the display panel during the whole touch-control phase.

2. The buffer unit of claim 1, wherein in the touch-control phase, a high level of 10V and a low level of 0V are applied to the touch-control scanning signal line in a time sharing manner, the output voltage of the shift register unit is −8V, an absolute value of a voltage difference between the pixel electrode and the common electrode is 5V, and the first value is 23V.

3. The buffer unit of claim 2, wherein the buffer unit comprises a high level input terminal, a low level input terminal, a target voltage input terminal for supplying the target voltage, a first strobe module and a second strobe module, a first input terminal of the first strobe module is connected to the high level input terminal, a second input terminal of the first strobe module functions as the input terminal of the buffer unit, a third input terminal of the first strobe module is connected to an output terminal of the second strobe module, the output terminal of the first strobe module functions as the output terminal of the buffer unit; a first input terminal of the second strobe module is connected to the low level input terminal, and a second input terminal of the second strobe module is connected to the target voltage input terminal, wherein
- in a charging sub-phase of a display phase, the high level input terminal is electrically connected to the output terminal of the first strobe module;
- in a voltage holding sub-phase of the display phase, the low level input terminal is electrically connected to the output terminal of the first strobe module; and
- in a touch-control phase, the target voltage input terminal is electrically connected to the output terminal of the first strobe module.

4. The buffer unit of claim 1, wherein the buffer unit comprises a high level input terminal, a low level input terminal, a target voltage input terminal for supplying the target voltage, a first strobe module and a second strobe module, a first input terminal of the first strobe module is connected to the high level input terminal, a second input terminal of the first strobe module functions as the input terminal of the buffer unit, a third input terminal of the first strobe module is connected to an output terminal of the second strobe module, the output terminal of the first strobe module functions as the output terminal of the buffer unit; a first input terminal of the second strobe module is connected to the low level input terminal, and a second input terminal of the second strobe module is connected to the target voltage input terminal, wherein
- in a charging sub-phase of a display phase, the high level input terminal is electrically connected to the output terminal of the first strobe module;
- in a voltage holding sub-phase of the display phase, the low level input terminal is electrically connected to the output terminal of the first strobe module; and
- in a touch-control phase, the target voltage input terminal is electrically connected to the output terminal of the first strobe module.

5. The buffer unit of claim 4, wherein the first strobe module comprises a first thin film transistor and a second thin film transistor, both gates of the first thin film transistor and the second thin film transistor are connected to the output terminal of the shift register unit, a first electrode of the first thin film transistor is connected to the high level input terminal, a second electrode of the first thin film transistor is connected to a first electrode of the second thin film transistor, and a second electrode of the second thin film transistor is connected to the output terminal of the second strobe module, wherein
- the first thin film transistor is controlled by the output voltage from the shift register unit so as to be turned on in the charging sub-phase of the display phase and to be turned off in the touch-control phase;
- the second thin film transistor is controlled by the output voltage from the shift register unit so as to be turned off in the charging sub-phase of the display phase and to be turned on in a voltage holding sub-phase and the touch-control phase.

6. The buffer unit of claim 5, wherein the second strobe module comprises a first strobe switch and a second strobe switch, the first strobe switch is connected between the low level input terminal and the output terminal of the second strobe module, the second strobe switch is connected between the target voltage input terminal and the output terminal of the second strobe module, wherein
- the first strobe switch is turned on in the voltage holding sub-phase of the display phase and is turned off in the charging sub-phase and touch-control phase; and the second strobe switch is turned on in the touch-control phase and is turned off in the display phase.

7. The buffer unit of claim 4, wherein the second strobe module comprises a first strobe switch and a second strobe switch, the first strobe switch is connected between the low level input terminal and the output terminal of the second strobe module, the second strobe switch is connected between the target voltage input terminal and the output terminal of the second strobe module, wherein
- the first strobe switch is turned on in the voltage holding sub-phase of the display phase and is turned off in the charging sub-phase and touch-control phase; and the second strobe switch is turned on in the touch-control phase and is turned off in the display phase.

8. The buffer unit of claim 7, further comprising a control module, which controls the first strobe switch to be turned on in the voltage holding sub-phase of the display phase and turned off in the touch-control phase, and controls the second strobe switch to be turned on in the touch-control phase and turned off in the display phase.

9. A touch-control driving circuit comprising the buffer unit of claim 1.

10. A display device comprising the touch-control driving circuit of claim 9 and a gate driving circuit, the gate driving circuit comprises a plurality of shift register units which are cascaded, each of the shift register unit corresponds to a said buffer unit, an output terminal of the shift register unit is connected to an input terminal of the buffer unit.

11. The display device of claim 10, wherein the shift register unit outputs a low level in a charging sub-phase of a display phase and outputs a high level in a voltage holding sub-phase of the display phase and the touch-control phase.

12. A driving method for driving the display device of claim 10, comprising:
- adjusting a voltage input to a gate line to a target voltage in a touch-control phase, wherein a difference between the target voltage and a voltage of the pixel electrode is smaller than a first value when a high level signal is applied to the touch-control scanning signal line.

13. The method of claim 12, wherein the buffer unit comprises a high level input terminal, a low level input terminal, a target voltage input terminal for supplying the target voltage, a first strobe module and a second strobe module, a first input terminal of the first strobe module is connected to the high level input terminal, a second input terminal of the first strobe module functions as the input terminal of the buffer unit, a third input terminal of the first strobe module is connected to an output terminal of the second strobe module, the output terminal of the first strobe module functions as the output terminal of the buffer unit; a first input terminal of the second strobe module is connected to the low level input terminal, and a second input terminal of the second strobe module is connected to the target voltage input terminal, wherein the step of adjusting a voltage input to a gate line to a target voltage in a touch-control phase comprises: controlling the target voltage input terminal to be electrically connected to the output terminal of the first strobe module;

the method further comprises:

in a charging sub-phase of a display phase, controlling the high level input terminal to be electrically connected to the output terminal of the first strobe module;

in a voltage holding sub-phase of the display phase, controlling the low level input terminal to be electrically connected to the output terminal of the first strobe module.

14. The method of claim 13, wherein the first strobe module comprises a first thin film transistor and a second thin film transistor, both gates of the first thin film transistor and the second thin film transistor are connected to the output terminal of the shift register unit, a first electrode of the first thin film transistor is connected to the high level input terminal, a second electrode of the first thin film transistor is connected to a first electrode of the second thin film transistor, and a second electrode of the second thin film transistor is connected to the output terminal of the second strobe module; the second strobe module comprises a first strobe switch and a second strobe switch, the first strobe switch is connected between the low level input terminal and the output terminal of the second strobe module, the second strobe switch is connected between the target voltage input terminal and the output terminal of the second strobe module;

the step of controlling the target voltage input terminal to be electrically connected to the output terminal of the first strobe module comprises: controlling the second strobe switch and the second thin film transistor to be turned on, and the first thin film transistor to be turned off;

the step of controlling the high level input terminal to be electrically connected to the output terminal of the first strobe module comprises: controlling the first thin film transistor to be turned on, and the second thin film transistor to be turned off;

the step of controlling the low level input terminal to be electrically connected to the output terminal of the first strobe module comprises: controlling the first strobe switch and the second thin film transistor to be turned on, and the first thin film transistor to be turned off.

* * * * *